(12) United States Patent
Roeglin et al.

(10) Patent No.: US 9,623,769 B1
(45) Date of Patent: Apr. 18, 2017

(54) SEAT PEDESTAL

(71) Applicant: LIPPERT COMPONENTS MANUFACTURING, INC., Elkhart, IN (US)

(72) Inventors: Timothy Roeglin, Elkart, IN (US); Hari Sunkara, Elkhart, IN (US)

(73) Assignee: LIPPERT COMPONENTS MANUFACTURING, INC., Elkhart, IN (US)

( * ) Notice: Subject to any disclaimer, the term of this patent is extended or adjusted under 35 U.S.C. 154(b) by 557 days.

(21) Appl. No.: 13/687,470

(22) Filed: Nov. 28, 2012

Related U.S. Application Data

(60) Provisional application No. 61/564,563, filed on Nov. 29, 2011.

(51) Int. Cl.
*F16M 13/00* (2006.01)
*B60N 2/14* (2006.01)
*F16H 37/12* (2006.01)

(52) U.S. Cl.
CPC .............. *B60N 2/14* (2013.01); *B60N 2/146* (2013.01); *F16H 37/12* (2013.01)

(58) Field of Classification Search
CPC ....... F16H 37/126; F16H 37/12; B60N 2/146; B60N 2/14
USPC .... 248/349.1, 416, 415, 417, 418, 424, 425, 248/429, 430, 186.1, 186.2, 279.1, 285.1; 297/344.22, 344.24, 344.26
See application file for complete search history.

(56) References Cited

U.S. PATENT DOCUMENTS

| 2,290,464 | A | * | 7/1942 | Buchheit ..................... 296/65.07 |
|---|---|---|---|---|
| 2,809,690 | A | * | 10/1957 | Walther et al. ............... 248/393 |
| 2,992,852 | A | * | 7/1961 | Loofbourrow et al. ........ 296/68 |
| 3,051,522 | A | * | 8/1962 | Myers ............................. 296/68 |
| 3,394,964 | A | * | 7/1968 | Humphries ............ B60N 2/143 248/425 |
| 3,572,817 | A | * | 3/1971 | Colautti ................. B60N 2/146 248/425 |
| 3,821,825 | A | * | 7/1974 | Bailey ........................... 114/363 |
| 3,834,660 | A | * | 9/1974 | Leffler .......................... 248/418 |
| 3,860,283 | A | * | 1/1975 | Colautti ..................... 296/65.07 |
| 4,122,571 | A | * | 10/1978 | Moeser ......................... 114/363 |
| 4,155,593 | A | * | 5/1979 | Swenson et al. ........ 297/284.11 |
| 4,401,287 | A | * | 8/1983 | Moeser ......................... 248/425 |
| 4,570,997 | A | * | 2/1986 | Tanizaki et al. ......... 297/344.24 |

(Continued)

*Primary Examiner* — Kimberly Wood
(74) *Attorney, Agent, or Firm* — Barnes & Thornburg LLP

(57) ABSTRACT

A seat pedestal includes an open base upon which a plate assembly is mounted for translational movement upon the base. The plate assembly includes a bottom plate, a seat mount for supporting a seat, and a bearing means between the bottom plate and the seat mount to permit the seat mount to rotate. One lock releasably secures the plate assembly in the driving position and another, which is self-actuating, releases the seat mount so that it can rotate freely when it is in the resting position. A stop carried by the seat mount defines a range in which the seat may be rotated. At least one pair of interlocking members couples the seat mount with the bottom plate to transfer lateral loads born by the seat to the base. The bottom plate, the bearing means, and the seat mount have concentric openings through which wires may pass for accessories such as power/heated seats, headrests, and computer screens and related accoutrements.

12 Claims, 6 Drawing Sheets

(56) References Cited

U.S. PATENT DOCUMENTS

| | | | |
|---|---|---|---|
| 4,705,256 A * | 11/1987 | Hofrichter | 248/418 |
| 4,802,708 A * | 2/1989 | Vos et al. | 297/252 |
| 5,149,092 A * | 9/1992 | Parsons | F41B 15/027 |
| | | | 135/40 |
| 5,482,354 A * | 1/1996 | Gryp | 297/344.22 |
| 5,720,462 A * | 2/1998 | Brodersen | 248/425 |
| 6,021,989 A * | 2/2000 | Morita et al. | 248/349.1 |
| 6,447,065 B1 * | 9/2002 | Ropp | 297/344.21 |
| 2002/0023995 A1 * | 2/2002 | Yoshida et al. | 248/425 |
| 2003/0160488 A1 * | 8/2003 | Kim | B60N 2/146 |
| | | | 297/344.22 |
| 2007/0222267 A1 * | 9/2007 | Tsujimoto et al. | 297/344.24 |
| 2009/0127908 A1 * | 5/2009 | Kucharski | B60N 2/0707 |
| | | | 297/344.24 |

* cited by examiner

SEAT PEDESTAL

REFERENCE TO RELATED APPLICATION

This application claims priority to U.S. Provisional Application No. 61/564,653, filed Nov. 29, 2011, which is hereby incorporated by reference.

FIELD OF THE INVENTION

The invention relates generally to articles of furniture and, more particularly, to a seat pedestal.

BACKGROUND OF THE INVENTION

Swivel chairs have become popular. Because such chairs often have large backs, arms and cushions, however, they are difficult to operate in restricted spaces such as vehicles. There is, therefore, a need for an improved seat pedestal. A seat pedestal that not only swivels, but one capable of allowing the seat's axis of rotation to be relocated to a roomier area away from walls and obstructions before swiveling is especially desirable. Such movement of the axis, other than to and fro, is especially desirable in vehicle as well as non-vehicle settings.

SUMMARY OF THE INVENTION

The present invention relates to a seat pedestal that includes a base with a top and a plate assembly connected to the top of the base by a connector. The plate assembly includes a bottom plate, a seat mount for supporting a seat, and a bearing means between the bottom plate and the seat mount to permit the seat mount to rotate about a center axis relative to the bottom plate. The connector is adapted for permitting translational movement of the bottom plate, the seat mount and the bearing means as a single unit upon the top of the base between a driving position, a resting position and therebetween.

In another aspect of the invention, a lock is provided for releasably securing the bottom plate in the driving position.

In another aspect, a self-actuating pin lock locks the seat mount to the bottom plate so that the seat mount may not rotate freely when the plate assembly is in the driving position. The pin lock is also self-actuating for releasing the seat mount from the bottom plate so that the seat mount may rotate freely about the plate assembly's center axis when the plate assembly is in the resting position.

In another aspect, the seat mount carries at least one stop configured to define a range of seat mount rotation about the center axis when the seat is in the resting position.

In still another aspect, at least one pair of interlocking members is provided for coupling the seat mount with the bottom plate to transfer lateral loads born by the seat to the base.

In yet another aspect, a stop plate is supported above the seat mount and connected with the bottom plate such that the stop plate, the bottom plate, the seat mount and the bearing means can move translationally as a single unit relative to the base. The stop plate includes abutments for contacting the stop to define a range of rotation of the seat mount about the axis.

One object of the invention is to provide an improved seat pedestal, which pedestal not only swivels, but is capable of allowing the seat's axis of rotation to be relocated translationally from its base, that is, the seat may be moved in a direction other than to and fro before swiveling. Related objects and advantages of the invention will be apparent from the following description.

BRIEF DESCRIPTION OF THE DRAWINGS

The details of the invention, both as to its structure and operation, may be obtained by a review of the accompanying drawings, in which.

DETAILED DESCRIPTION OF INVENTION

Figure 1:
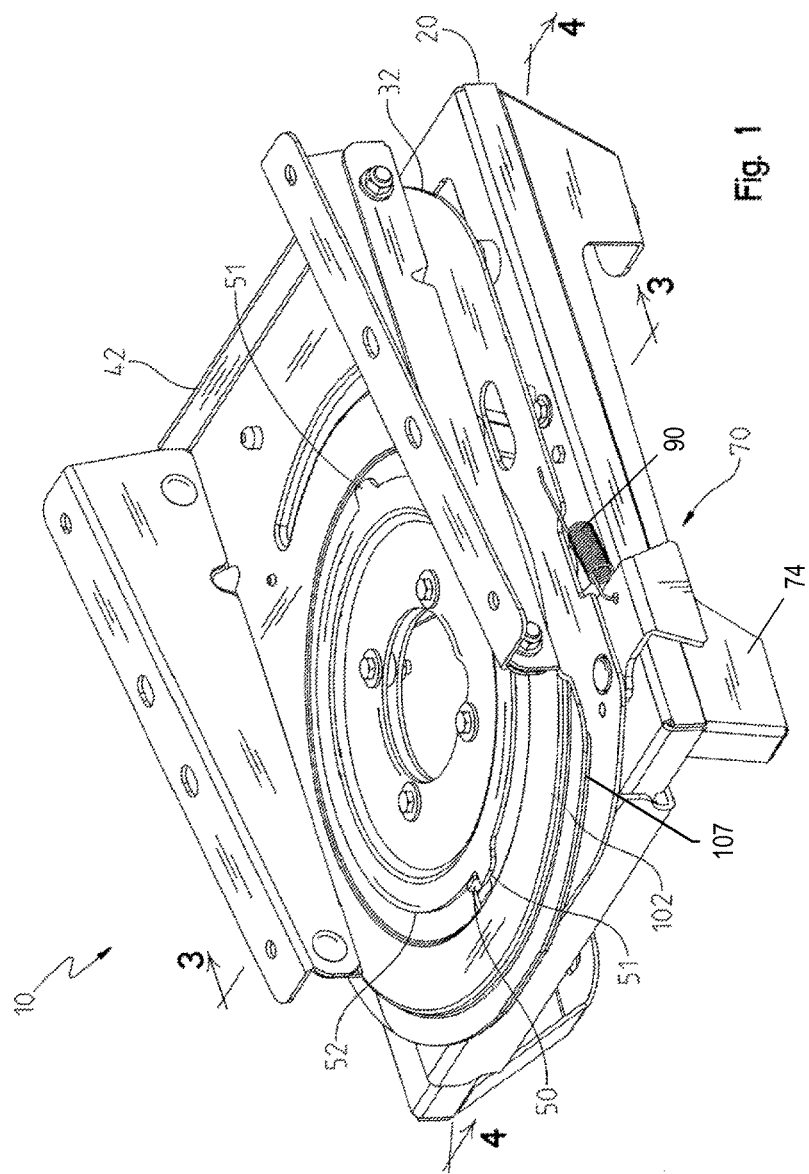
FIG. 1 is an isometric view of an embodiment of the present invention.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention pertains.

Referring to the Figures, a seat pedestal 10 for a vehicle seat 12 includes a base 20 and a plate assembly 30 connected to the top 22 of the base by a connector 60. The seat pedestal is shown from a rear side in a forward position for driving, corresponding to FIG. 6A but may also be configured to a second position according to FIG. 6B. The plate assembly 30 includes a bottom plate 32, a seat mount 42 for supporting a seat, and a stop plate 52 with peripheral abutments 51. The bottom plate 32 and the seat mount 42 each has an opening 31, 41. A bearing means 112 is located between the bottom plate 32 and the seat mount 42 to permit the seat mount to rotate about a center axis 43 relative to the bottom plate 32 and base 20.

In this description "bearing means" shall mean any of various machine elements or surfaces that allow or promote free rotation about a fixed axis.

Figure 2:
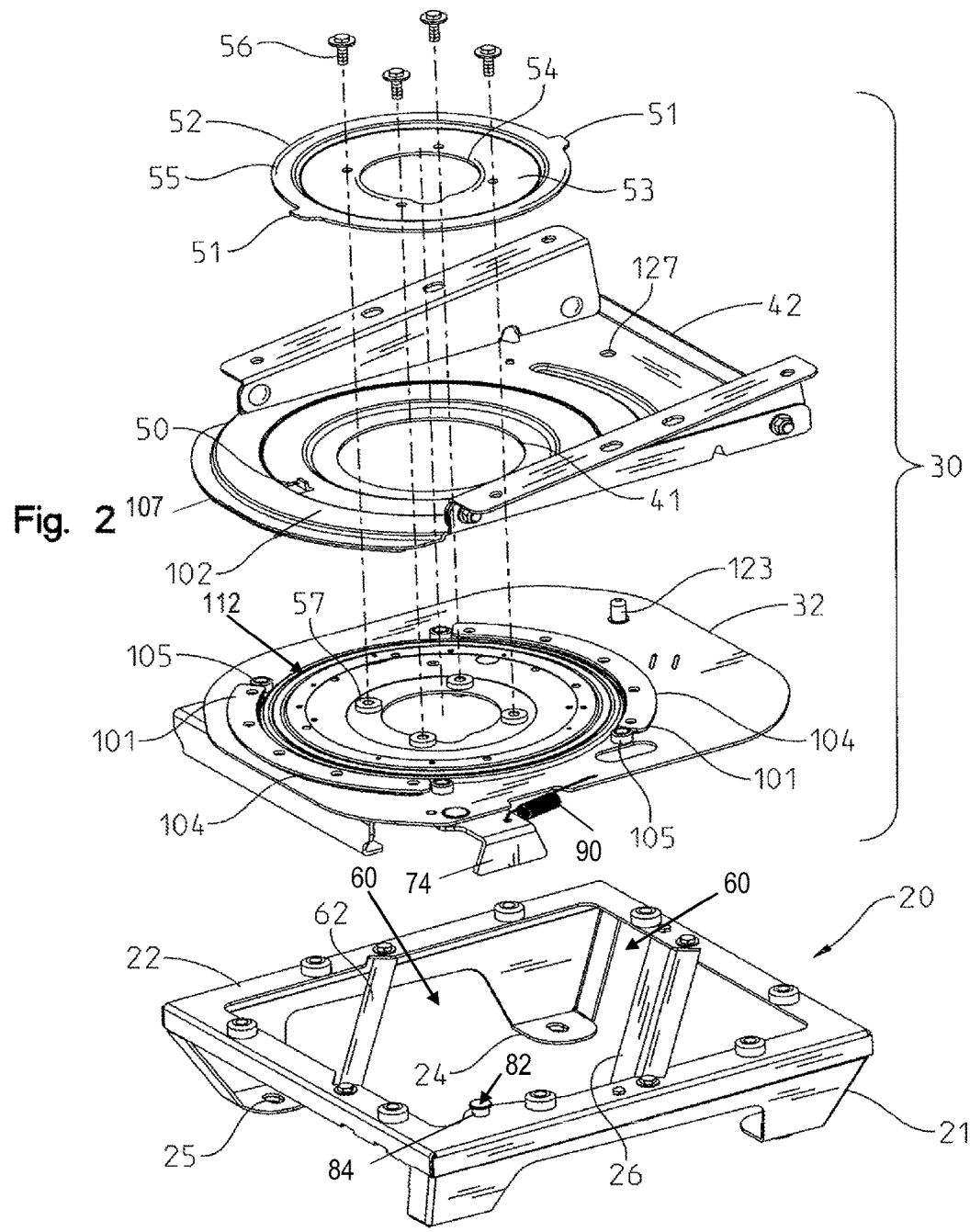
FIG. 2 is an exploded perspective view of an embodiment of the invention showing the plate assembly disassembled from the base.

The connector 60 is adapted for permitting translational movement of the bottom plate 32, the seat mount 42 and the bearing means 112 as a single unit upon the top 22 of the base 20 from a driving position (FIG. 6A) to a resting position (FIG. 6B) and therebetween. In the embodiment illustrated, the base 20 includes an open frame supported by four legs 21. Each of the legs may, optionally, be adapted for mounting to the floor of a vehicle, as shown in FIG. 2. In that embodiment, each of the legs includes an inwardly facing planer toe 24 with a bore 25 for receiving an anchoring bolt for securing the base to the floor. Attached at their respective ends to the sides of the base 20, a cam bracket 26 and connector support bar 62 span across the open frame for supporting and operating the connector 60 and the pin lock 120, as described below.

The base 20 and the components of the plate assembly 30 and connector 60 are preferably formed from a rigid metal, such as steel, metal alloy, or the like. Components of the invention are formed using known metal working techniques, including rolling, pressing, lathe and stamping processes. Additional mechanical structures described below are formed, shaped and assembled using known methods and secured to the base 20, bottom plate 32, or seat mount 42 using known fastening means, including bolts, screws welds and the like. In some embodiments, plastic may be used to mold or otherwise form the base 20 as well as the components comprising some or all of the plate assembly 30. Obviously, vehicular and other safety standards, technologies available, preferred physical properties based on the application, e.g., vehicular, non-vehicular, and cost may drive the type of materials used from which to form the base 20 and the components of the plate assembly 30.

In one embodiment, the connector 60 includes at least one slide support bar 62 connected to the base and at least one sliding tube 64 carried by the underside of the bottom plate 32. The bar 62 is made to slide within the tube 64. Skilled artisans should recognize that various other mechanical and electromechanical substitutes may be used as a connector 60. Examples may include male/female interlocking tracks, gears, a sprocket or cogwheel with a belt or a chain-driven assembly. A wheel with teeth adapted to drive mechanical movement along a track having spaced grooves or apertures that receive the teeth serves as another example. Pneumatic and closed fluid systems using piston and cylinder assemblies are also contemplated for adaptation as a connector 60 for connecting the plate assembly 30 to the base 20 and for facilitating translational movement as herein described.

Figure 5:
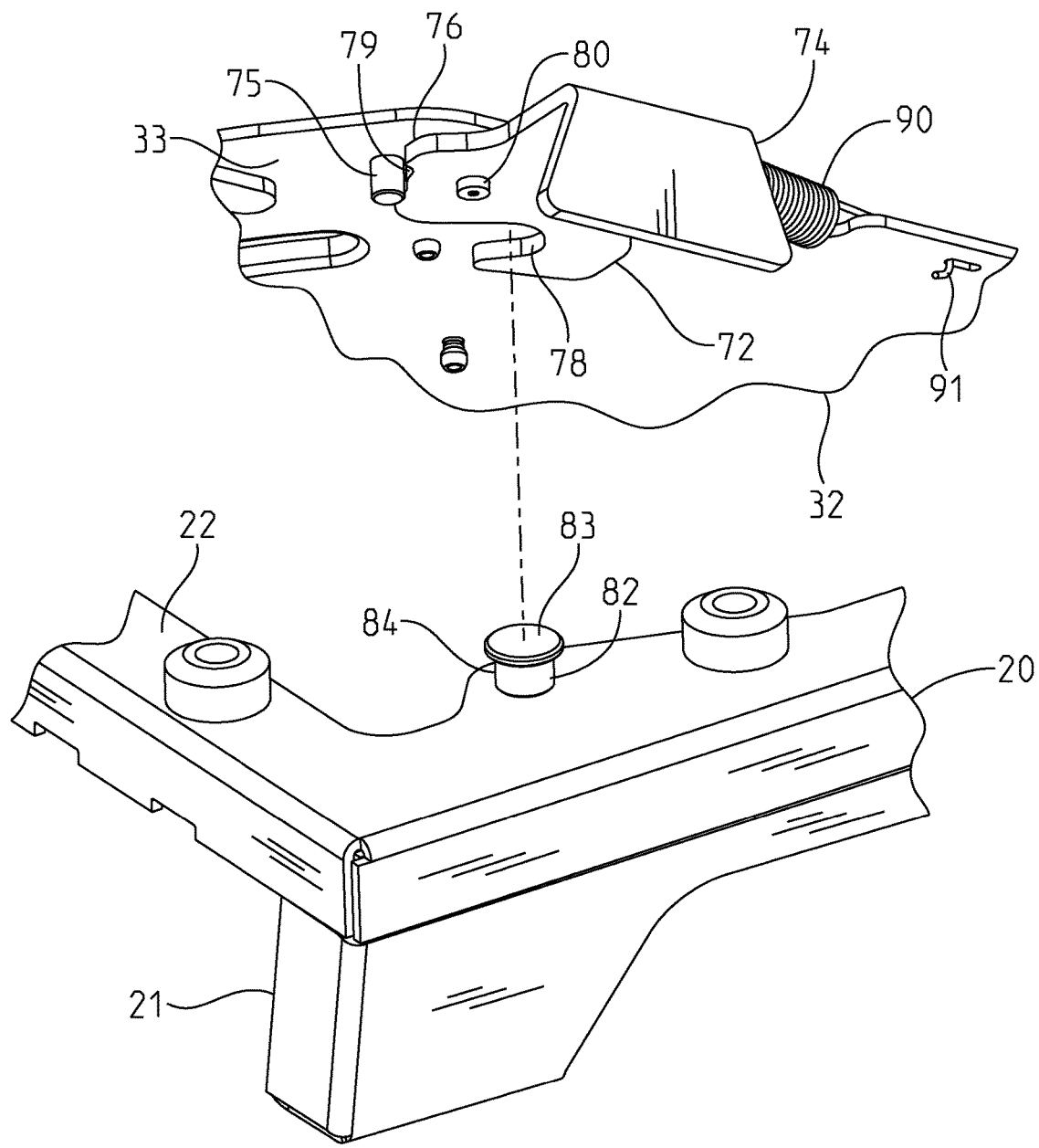
FIG. 5 is a partial-cutaway enlarged view showing the lock of the invention.

With reference to FIGS. 1 and 5, a lock mechanism 70 has a handle 74 that extends outwardly from between the plate assembly 30 and base 20, as shown in FIG. 5. A pin 82 with a shaft 84 and a head 83 extends upwardly from the top 22 of the base 20. A flat body 72 carried by the underside 33 of the bottom plate 32 pivots at pivot 80. In the embodiment illustrated, the body 72 comprises a side index portion 76, which rides against the downwardly extending pin 75 to be captured in the hold 79 to provide a self-locking feature of the invention when the plate assembly 30 is moved from the resting position into the driving position. A cradle portion 78 is formed in the body 72 for surrounding the shaft 84 of the pin 82 to releasably secure the plate assembly 30 in the driving position. A coil spring 90 is connected at one end 91 to the bottom plate 32 and to the body 72 at its other end for constantly urging the cradle portion 78 against the pin 82.

In use, upon releasing the lock 70 via handle 74, the seat occupant or another person may move the seat including the plate assembly 30, via the connector 60 translationally relative to the base 20. Thus, the center axis 43 of the plate assembly is relocated from the center axis 23 of the base 20, as shown in FIGS. 6A-6B. The seat mount 42 and thus, the seat 12 rotates or swivels by way of the bearing means 112. Skilled artisans should recognize that any of various machine elements or surfaces that allow or promote free rotation about a fixed axis may be used as a bearing means between the seat mount 42 and bottom plate 32. Male/female interlocking components, assemblies whose surfaces are adapted to slide one upon another, and mechanical structures that sandwich ball bearings are non-limiting examples of such bearing means.

Figure 3:
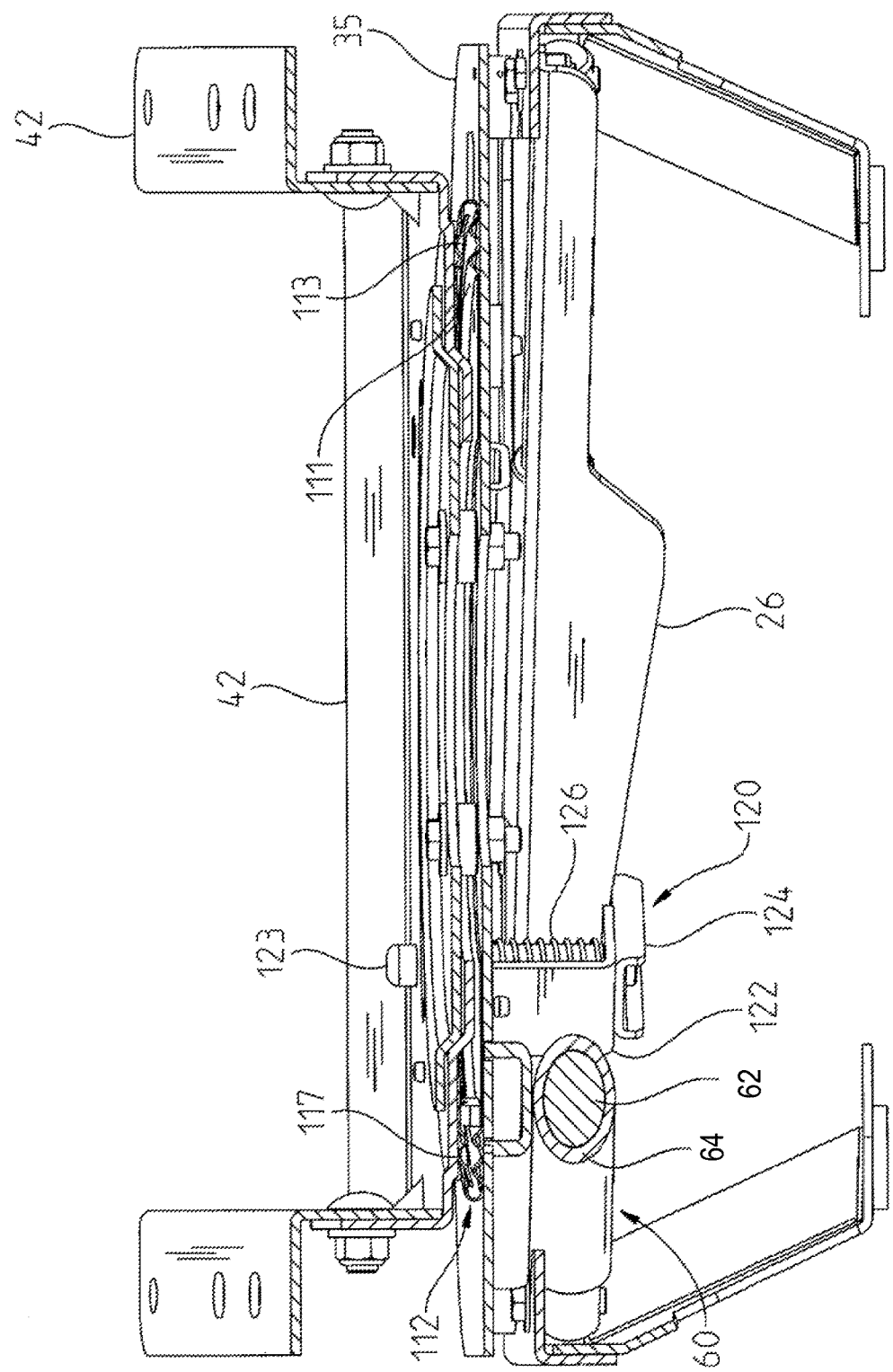
FIG. 3 is a cross-section of the embodiment of the seat pedestal of FIG. 1 taken along line 3-3 of FIG. 1 showing the cam bracket, the pin lock, the slide support bar and sliding tube.

In the embodiment illustrated, a first element 111 fastened to the top side 35 of the bottom plate 32 is complementarily shaped to receive at least a portion of a second element 117 carried by the under side of the seat mount 42, as shown in FIG. 3. The elements 111, 117 may be separate specially shaped plates secured to their respective surfaces or the elements may be integrally formed in their respective surfaces. In the embodiment shown in FIG. 3, the two elements 111, 117 are generally closed rings having cross sections that are generally in the shape of an S or Z. When the elements 111, 117 are assembled together, at least a portion of the second element 117 is overlapped or received by the first element 111. The tolerances between the elements are such as to permit rotation of second element 117 within the first.

In one embodiment, when assembled, the elements 111, 117 define a space 113, in which ball bearings (not shown) may reside. In another embodiment, elements 111, 117 fit together in the manner as described above and may not use or require ball bearings.

Figure 6C:
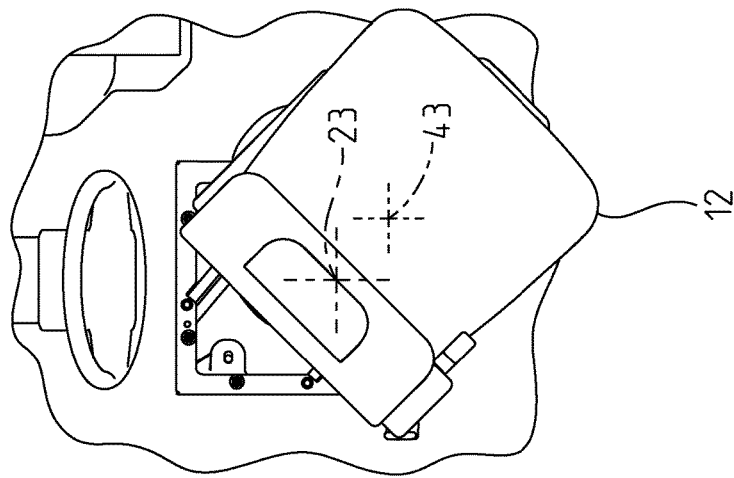
FIG. 6C is the seat of FIG. 6B shown rotated to face the rear of the vehicle compartment.
Figure 6B:
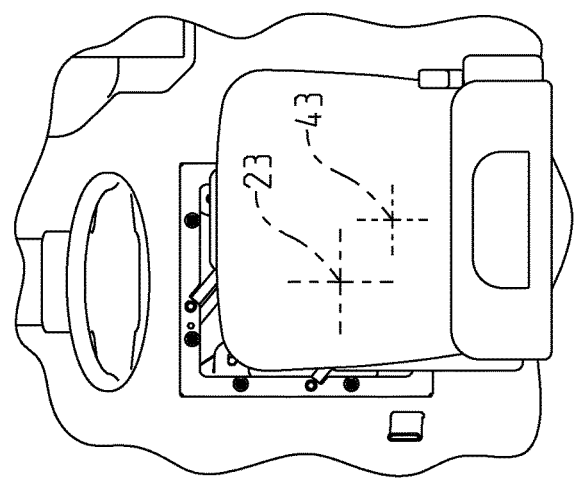
FIG. 6B is the seat of FIG. 6A shown in the resting position.
Figure 6A:
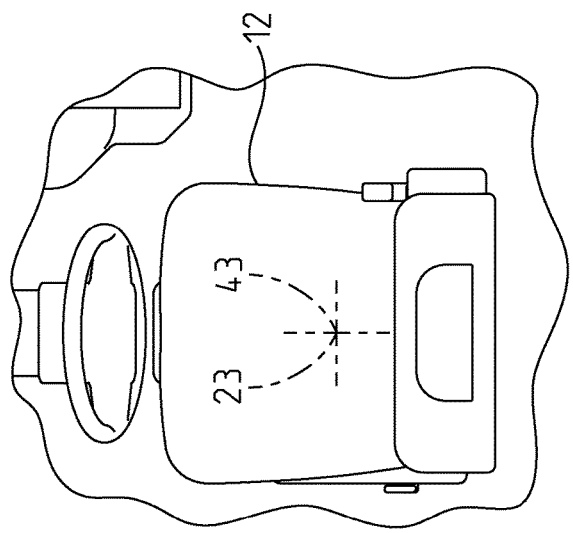
FIG. 6A is a top partial-cutaway schematic view of the driver's side of a vehicle compartment showing a seat carried by the seat pedestal of the invention in the driving position. The center axes of the base and the plate assembly are located at the same point.

The seat mount 42 carries at least one stop 50 configured to define a range of seat mount rotation about the center axis 43 when the seat is in the resting position, as shown in FIGS. 6B-6C. A stop plate 52 is supported above the seat mount 42. In one embodiment, the stop plate comprises a generally round body with a depressed central area 53 with an opening 54 and a peripheral lip 55. The depressed central area of plate 52 and its fit within the central part of the seat mount 42 also contributes to the pedestal's ability to absorb lateral forces. Oppositely disposed abutments 51 or ears extend outwardly from the periphery of the lip 55.

Figure 4:
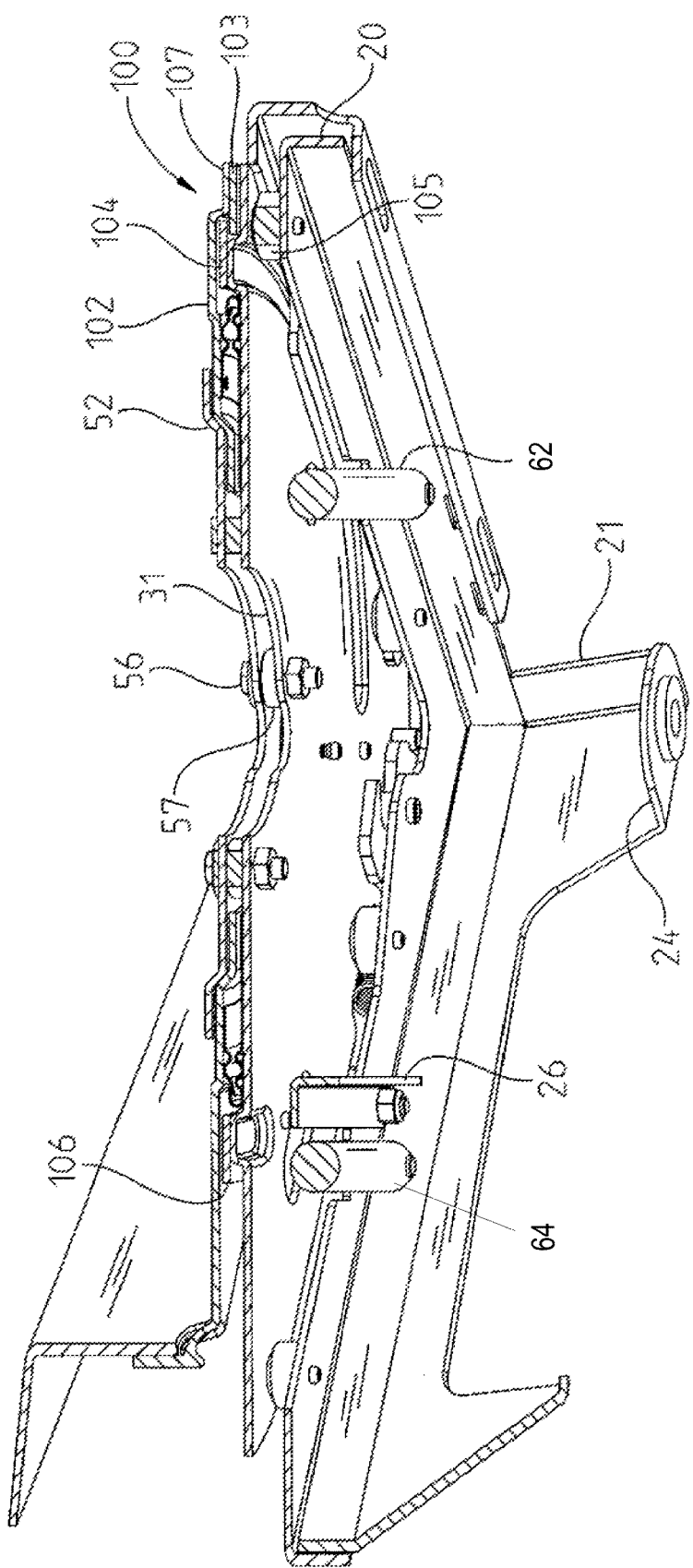
FIG. 4 is a cross-section of the embodiment of the seat pedestal of FIG. 1 taken along line 4-4 of FIG. 1 showing the bearing means and the interlocking members.

The stop plate 52, preferably, is bolted to the bottom plate 32 with bolts 56, and spacers 57 are positioned on the top surface of the bottom plate 32, as illustrated in FIGS. 2 and 4. Spacers 57 provide a space between the stop plate 52 and the bottom plate 32 within which the seat mount may freely rotate without surface-to-surface contact therebetween. In the embodiment illustrated, however, the range of rotation of the seat mount 42 about axis 43 is defined when the abutments 51 contact the stop 50, as best shown in FIG. 1.

The complementary shapes of the central portions of the stop plate 52 and the seat mount 42, as best depicted in FIG. 3, prevent "chucking," that is, rocking of the seat that commonly occurs in the prior art caused by lateral loads delivered to the seat over time. Additionally, their corresponding openings 41, 54 also allow wires to pass and be concealed so that accessories such as power/heated seats, headrests, and computer screens and related accoutrements can be used with the seat pedestal 10.

Referring to FIG. 1-4, interlocking members 100 couple the seat mount 42 with the bottom plate 32. An arcuate-shaped member 102 carried by the underside 33 of the seat mount 42 and at least one other arcuate-shaped member 104 on a top side 35 of the bottom plate 32 interlock. Preferably, one of the members is adapted to encapsulate the other of the members when the seat mount is in the driving position, the resting position, or therebetween, including when the seat mount rotates so that lateral loads born by the seat 12 may be transferred to the base 20. Hence, in one embodiment, the arcuate-shaped member 102 comprises a tongue 107 (FIG. 4), which may be an additional metal piece welded to the underside of member 102 to define an overhang 103 or member 102 folded back onto itself.

In one particular embodiment, with reference to FIGS. 1-2 and 4, bumpers, or rollers 105 located at both ends of the members 104 may, or may not, be adapted to freely rotate upon engagement of the arcuate member 102 as it is rotatably carried by the seat mount 42 when the seat mount rotates about axis 43. Rollers/bumpers 105 may be formed from a rigid metal, plastic or various known materials that resist wear and friction. One example is TEFLON. Rollers 105 guide and ease movement of the arcuate-shaped member 102 so that the overhang 103 of the arcuate-shaped member 102 aligns with and encapsulates the edge 106 of the arcuate-shaped member 104 on the top side 35 of the bottom plate 32. In this manner, lateral loads born by the seat 12 may be transferred to the base 20 when the seat mount is in the driving position, the resting position, or therebetween.

Referring to FIG. 3, another lock, a pin lock 120 prevents the seat from freely rotating when it is in the driving position. The pin lock 120 includes a frame 122, a pin 123 and an elongated base 124 that carries the pin. The pin and base 123, 124 are movable up and down relative to the frame permitting the pin 123 to penetrate a bore 127 (FIG. 2) that extends through the seat mount 42. A coil spring 126 encircling the pin resides between the base 124 and a top seating portion of the frame, which is obscured in the view of FIG. 3. The spring 126 constantly urges the base 124 and thus the pin and the top of the frame 122 apart.

The pin lock 120 is secured to the bottom plate 32 and thus moves translationally with the plate assembly 30 from the driving position to the resting position, as shown in FIGS. 6A-6B. As the seat is moved, the elongated base 124 of the pin lock 120 travels against the cam bracket 26 and incrementally relaxes spring 126 drawing pin 123 downward through bore 127. In this manner, the pin lock 120 is self-actuating. Hence, the pin is made to incrementally ascend into the bore 127 in the seat mount 42 and prevent its rotation as the base 124 is cammed upward along the slope of the bracket 26 upon returning the seat from the resting position to the driving position.

The pedestal is scalable to multiple platforms for meeting a broad range of OEM seat options, including the front driver and passenger positions of the same. Additionally, the inventors contemplate an apparatus like that shown in the drawings whose translational as well as rotational movement is driven using known electromechanical components with controls for operating the movement of the plate assembly. In that embodiment, the controls may be installed in the seat 12, the pedestal 10 or in the console of, for example, a vehicle. Of course, RF transceivers may be electrically connected to the mechanical parts described herein so that operation of the seat may be by way of a hand held electronic device as well.

As shown schematically in FIGS. 6A-6C, the new pedestal may be used to support and carry a seat mounted in a vehicle, e.g., recreational or other vehicle, where it may be desirable to orient the seat toward the rear of the vehicle. The seat pedestal 10 has application in any tight, confined space whether the space is defined by a building structure or whether it is mobile, as in a vehicle. The pedestal provides for seat movement rearward and inboard to clear vehicle pillars, steering wheel and, in some cases, the engine cover, then swivels about its relocated center axis 43.

While the invention has been illustrated and described in detail in the drawings and foregoing description, the same is to be considered illustrative and not restrictive in character. It is understood that the embodiments have been shown and described in the foregoing specification in satisfaction of the best mode and enablement requirements. It is understood that one of ordinary skill in the art could readily make an infinite number of insubstantial changes and modifications to the above-described embodiments and that it would not be practical to attempt to describe all such embodiment variations in the present specification. Accordingly, it is understood that all changes and modifications that come within the spirit of the invention are desired to be protected.

What is claimed is:

1. A seat pedestal for supporting a seat, comprising: a base with a top, and a plate assembly connected to the top of the base by a connector, the plate assembly comprising a bottom plate, a seat mount for supporting a seat, a bearing between the bottom plate and the seat mount to permit the seat mount to rotate about a center axis relative to the bottom plate and base, said connector being adapted for permitting translational movement of said bottom plate and said seat mount and said bearing as a single unit upon the top of the base from a driving position to a resting position by disengagement of a slide lock wherein said seat mount may rotate upon disengagement of a self-actuating pin lock due to movement from the driving position toward the resting position, wherein the seat mount carries at least one stop configured to define a range of seat mount rotation about the center axis when said seat is in the resting position, and further wherein a stop plate is supported above the seat mount and connected with the bottom plate such that said stop plate and said bottom plate and said seat mount and said bearing is able to move translationally as a single unit relative to the base, said stop plate comprising abutments for contacting said stop to define a range of rotation of said seat mount about said axis.

2. The seat pedestal according to claim 1, said slide lock releasably securing said bottom plate in the driving position.

3. The seat pedestal according to claim 1, said pin lock releasably securing said seat mount to the bottom plate such that the seat mount may not rotate freely.

4. The seat pedestal according to claim 1, further comprising at least one pair of interlocking members for coupling the seat mount with the bottom plate for transferring lateral loads born by the seat to the base.

5. A seat pedestal for supporting a seat comprising, a base having a top and a first center axis, a plate assembly also having a second center axis, said plate assembly is connected to the top of the base by a connector, said connector is adapted for permitting angled translational movement of said plate assembly upon the top of the base between a driving position, wherein each of said first and second center axes define a single axis, and a resting position, wherein the second center axis of the plate assembly is located away and angularly relative to the first center axis of the base, said angled translational movement occurring by release of a slide lock and further wherein said seat becomes rotatable by disengagement of a self-actuating pin lock with said angled translational movement toward the resting position, wherein the plate assembly comprises a bottom plate, a seat mount for supporting a seat, a bearing between the bottom plate and the seat mount to permit the seat mount to rotate about the center axis of the plate assembly, wherein the seat mount carries at least one stop configured to define a range of seat mount rotation about the center axis of the plate assembly when said seat is in the resting position, wherein a stop plate is supported above the seat mount and connected with the bottom plate such that said stop plate and said bottom plate and said seat mount and said bearing moves translationally as a single unit relative to the base, said stop plate comprising abutments for contacting said stop to define a range of rotation of said seat mount about said axis.

6. The seat pedestal according to claim 5, said slide lock releasably securing said plate assembly in the driving position.

7. The seat pedestal according to claim 5, said self-actuating pin lock locking the seat mount to the bottom plate so that the seat mount may not rotate freely when the plate assembly is in the driving position, and for releasing the seat mount from the bottom plate so that the seat mount may rotate freely about the plate assembly's center axis when the plate assembly is in the resting position.

8. The seat pedestal according to claim 5, further comprising at least one pair of interlocking members for coupling the seat mount with the bottom plate for transferring lateral loads born by the seat to the base.

9. The seat pedestal according to claim 8, wherein said at least one pair of interlocking members comprising at least one arcuate-shaped member carried by an underside of said seat mount and at least one other arcuate-shaped member on a top side of said bottom plate, one of said members being adapted to encapsulate the other of said members when the seat mount is in the driving position, wherein lateral loads born by the seat may be transferred to the base.

10. A seat pedestal for supporting a seat comprising:
   a base with an open top, and a plate assembly connected to the top of the base by a connector, the plate assembly comprising:
   a bottom plate;
   a seat mount for supporting a seat;
   a bearing between the bottom plate and the seat mount to permit the seat mount to rotate about a center axis relative to the bottom plate, the bottom plate and the seat mount each having an opening, the openings are concentric, said connector being adapted for permitting translational movement of said bottom plate and said seat mount and said bearing as a single unit upon the top of the base between a driving position and a resting position and therebetween, said translational movement being independent of said rotation about said center axis relative to the bottom plate;
   a slide lock for releasably securing said plate assembly in the driving position; and
   a self-actuating pin lock for locking the seat mount to the bottom plate so that the seat mount may not rotate freely when the plate assembly is in the driving position, and for releasing the seat mount from the bottom plate so that the seat mount may rotate freely about the plate assembly's center axis when the plate assembly is in the resting position, said self-actuating pin lock disengaging due to said translational movement;
   wherein said connector comprises at least one slide support bar connected to the base, and at least one sliding tube carried by an underside of said bottom plate, the bar is slidable within the tube;
   wherein the seat mount carries at least one stop configured to define a range of seat mount rotation about the center axis when said seat is in the resting position;
   wherein a stop plate is supported above the seat mount and connected with the bottom plate such that said stop plate and said bottom plate and said seat mount and said bearing is able to move translationally as a single unit relative to the base, said stop plate comprising abutments for contacting said stop when the seat mount rotates to define a range of rotation of said seat mount about said axis.

11. The seat pedestal according to claim 10, further comprising at least one pair of interlocking members for coupling the seat mount with the bottom plate for transferring lateral loads born by the seat to the base.

12. The seat pedestal according to claim 11, wherein said at least one pair of interlocking members comprising at least one arcuate-shaped member carried by an underside of said seat mount and at least one other arcuate-shaped member on a top side of said bottom plate, one of said members being adapted to encapsulate the other of said members when the seat mount is in the driving position, the resting position, or therebetween, wherein lateral loads born by the seat may be transferred to the base.

\* \* \* \* \*